United States Patent [19]

Höfel et al.

[11] 3,878,136

[45] Apr. 15, 1975

[54] PROCESS FOR THE MANUFACTURE OF DISPERSIONS OF THERMOSETTING PHENOLIC REACTION PRODUCTS

[75] Inventors: Heinz-Bernhard Höfel; Hans-Joachim Kiessling, both of Hamburg; Fred Lampert, Barsbuttel Achtern Barg, all of Germany

[73] Assignee: Hoechst Aktiengesellschaft, Frankfurt/Main, Germany

[22] Filed: June 18, 1973

[21] Appl. No.: 370,768

[30] Foreign Application Priority Data
Sept. 19, 1972  Switzerland.................... 13674/72
June 19, 1972  Switzerland...................... 9197/72

[52] U.S. Cl.............. 260/14; 117/161 L; 260/29.3; 260/51.5; 260/51 R; 260/53 R; 260/57 A
[51] Int. Cl...................... C08b 21/32; C08g 37/14
[58] Field of Search................... 260/29.3, 51.5, 14

[56] References Cited
UNITED STATES PATENTS
| | | | |
|---|---|---|---|
| 2,482,525 | 9/1949 | Wachter | 260/29.3 |
| 2,675,335 | 4/1954 | Rankin et al. | 260/29.3 |
| 3,351,612 | 11/1967 | Brown et al. | 260/29.3 |
| 3,459,128 | 8/1969 | Erdmann | 260/29.3 |
| 3,697,482 | 10/1972 | Hunsucker | 260/29.3 |
| 3,703,494 | 11/1972 | Anderson et al. | 260/29.3 |
| 3,761,448 | 9/1973 | Anderson et al. | 260/29.3 |
| 3,770,544 | 11/1973 | Holt | 260/29.3 |

FOREIGN PATENTS OR APPLICATIONS
| | | | |
|---|---|---|---|
| 909,433 | 9/1972 | Canada | 260/29.3 |

OTHER PUBLICATIONS
Vol. 653, O.G., 12/18/51, p. 859, Abstract 713,087, Schwartzberg, "Phenolic Coating Composition and Process."

Primary Examiner—Morris Liebman
Assistant Examiner—Edward Woodberry
Attorney, Agent, or Firm—Gordon W. Hueschen

[57] ABSTRACT

Subject of the invention is a process for the manufacture of water-dilutable, self-emulsified, aqueous dispersions of thermosetting reaction products of monohydroxybenzene compounds, or mixtures of monohydroxybenzene compounds, with formaldehyde and secondary amines in water, wherein these components are reacted with one another under warm conditions.

7 Claims, No Drawings

PROCESS FOR THE MANUFACTURE OF DISPERSIONS OF THERMOSETTING PHENOLIC REACTION PRODUCTS

BACKGROUND OF THE INVENTION

1. Field of the Invention

The present invention relates to a process for the manufacture of water-dilutable, self-emulified, aqueous dispersions of thermosetting reaction products of monohydroxybenzene compounds, or mixtures of monohydroxybenzene compounds, with formaldehyde and secondary amines in water, these components being reacted with one another under warm conditions.

Numerous proposals for manufacturing aqueous self-emulsified dispersions of thermosetting phenolic resins have already been described in the relevant literature. However, the previous proposals have not proved successful in practice so that dispersions of thermosetting phenol-formaldehyde resol resins are not yet normal, commercially available articles.

2. Prior Art

German Offenlegungsschrift 1,745,192 describes a process for the manufacture of self-emulsified aqueous emulsions of phenol-formaldehyde resol resins for impregnating fibrous substances, such as paper, in which the phenol is reacted with an excess of formaldehyde in water in the presence of organic bases containing amino groups, and which is characterised in that the reaction between phenol and formaldehyde is carried out in an aqueous medium in which organic nitrogen bases having tertiary and primary and/or secondary amino groups are present, the ratio of the tertiary amino groups on the one hand to the primary and/or secondary amino groups on the other between 1:2.5 and 1:1.5.

This process can only give aqueous emulsions in which the condensation between phenol and formaldehyde has not been carried to completion. This means that these emulsion still contain free phenol and/or formaldehyde which are both still toxic so that when processing these emulsions special precautionary measures are necessary, using expensive installations, to avoid impermissible pollution of the environment. Additionably these emulsions do not contain cations, so that coagulation of agent having anions is not possible therewith.

German Offenlegungsschrift 1,595,038 describes a process for the manufacture of an emulsion of a thermosetting, low molecular reaction product of a monohydroxybenzene compound or of a mixture of monohydroxybenzene compounds and formaldehyde in water, wherein the compounds mentioned are reacted with one another in water in the presence of a substance having a basic reaction, and using an amide with a long carbon chain as the plasticiser, and which is characterised in that oleylamide is used as the amide. These emulsions possess the disadvantages already explained above since, being reaction products of a low degree of condensation, they still contain substantial proportions of free phenol and/or formaldehyde. Furthermore, the emulsified phenol-formaldehyde resin obtained according to this process is so brittle that it can only be used together with an additional plasticiser, which can result in further disadvantages through migration of the plasticiser.

It is the objective of the present invention to improve in various directions the phenol-formaldehyde resins of conventional type as aqueous dispersions. As is known, thermosetting aqueous solutions of phenol-formaldehyde resins can only be stored for a few weeks since they condense further over a period of time and hence lose their solubility in water. However, in order to be capable of storage for at least a few weeks, the resins must necessarily still contain considerable proportions of free phenol and free formaldehyde. Some types of these phenolic resin solutions are furthermore alkaline and hence contain ions. On processing these aqueous phenol-formaldehyde resin solutions, considerable amounts of phenol and formaldehyde evaporate, so that special precautionary measures must be taken to prevent impermissible pollution of the environment by these highly toxic compounds. The phenol-formaldehyde resins contained in the dispersions according to the invention are in a stable form so that these dispersions can be stored for a practically unlimited time. After prolonged storage the dispersions may set, however they can be dispersed again by simple mechanical stirring. Furthermore, the proportion of undesired volatile constituents is several powers of ten lower than in the known phenolic resin solutions. Furthermore, the phenol-formaldehyde resins contained in the dispersions manufactured according to the invention can be manufactured extremely economically since the starting substances are practically 100% converted to the resin. This however also results in a greater efficiency in further processing since, in comparison to the previous aqueous solutions, unreacted reactants are no longer present as diluents. Since volatile constituents are no longer present, as previously, during processing, but have been converted into resin, both the economics of manufacture and the economics of use are abruptly and unforeseeably improved and a considerable contribution is made to avoiding pollution of the environment.

Furthermore, the dispersions according to the invention have the great advantage that they can also replace the previous phenolic resin solutions in which the phenolic resin is present as a solution in an organic solvent. The previously known phenolic resin solutions also still contain free phenol, free formaldehyde and organic solvent, which in general also has a toxic action. Hence, replacement of these phenolic resin solutions results in considerable advantages in industrial hygiene. However, considerable economic advantages also result since the previously required explosion-proof processing installations (solvent recovery installations) are not needed. Furthermore, processing the dispersions manufactured according to the invention is considerably simpler than in the case of phenolic resin dissolved in a solvent, since the substrates treated with the dispersions manufactured according to the invention are in general only subjected to a physical drying process and are then in the form of finished goods or semi-finished goods which can be processed further. Furthermore, the dispersions made according to the process of the invention have the advantages to be depositable electrophoretically.

SUMMARY

The subject of the invention is a process for the manufacture of water-dilutable, self-emulsified, aqueous dispersions of thermosetting reaction products of monohydroxybenzene compounds, or mixtures of monohydroxybenzene compounds, with formaldehyde and secondary amines in water, wherein these components are reacted with one another under warm conditions, charaterised in that a mixture consisting of a substituted phenol and phenol, formaldehyde or formaldehyde donors and a secondary amine (individually or as mixtures), the mixture of substituted phenol and phenol being employed in such ratios that the average functionality of the sum of the phenolic compounds relative to formaldehyde is between 2.1 and 2.8, and the amount of formaldehyde being so chosen that the molar ratio of the total sum of added formaldehyde to the sum of phenolic compounds is between 0.9 and 1.5:1, and the secondary amine being used in amounts of 50 to 200 mol per cent, relative to the total weight of the phenols, is employed, and an amount of acid equivalent to the amine, in the presence of such amounts of water that the sum of added water and water of reaction is 30 to 60 % by weight, relative to the weight of the total batch, is employed, and the batch is warmed until a sample of the dispersion has a B-time of 30 seconds to 10 minutes at 160°C, and the batch is subsequently cooled whilst stirring and optionally whilst adding water and/or protective colloids.

The B-time or curing time test is carried out based on test procedure 4 described in the book "Kunststoff-Praktikum" ("Practical Plastics") (Gaeteno D'Alelio, Carl Hanser-Verlag/Munich 1952), page 174, wherein 0.3 g of resin is stirred at the indicated temperature in a bowl of 2 cm diameter and maximum depth 8 mm, by means of a glass rod drawn out to a point, until the resin has cured, and the time required for this is measured.

By thermosetting reaction products of monohydroxybenzene compounds or mixtures of monohydroxybenzene compounds with formaldehyde there are understood resinous condensates such as are known to those skilled in the art uner the description resols (see Ullmanns Enzyklopaedie der technischen Chemie, Verlag Urban & Schwarzenberg, Muenchen, Berlin 1962, p. 459–467).

Suitable substituted phenols are those which contain as substituents, alkyl radicals with 1 – 30 C atoms, cycloalkyl radicals with 5 – 10 C atoms which can be of monocyclic or bicyclic structure, alkenyl radicals with 1 – 30 C atoms and/or cycloalkenyl radicals with 5 – 10 C atoms which are also of monocylic or bicyclic structure. Halogen-substituted phenols and aryl-substituted phenols with an aromatic ring in the substituent are also suitable.

Substituted phenols must be so chosen that they possess 1, 2, 3 or 4 substituents in the phenol nucleus, but at least 1 carbon atom of the phenol which is capable of reacting with formaldehyde must be present in the ring, and the speed of reaction of the substituted phenol with formaldehyde is 40 to 150% of the speed of reaction of the unsubstituted phenol. (Compare L.A. Cohen and W.M. Jones; Journal of the American Chemical Society, year 85 (1963), page 3402. The speed of reaction can be determined by comparative measurements of the formaldehyde consumption as a function of the reaction time in alkaline molar solutions of the phenols). By reaction speed there is here understood the effective reaction speed measured in the heterogeneous medium.

However, preferred substituted phenols are those which contain 2 carbon atoms, capable of reacting with formaldehyde, in the phenol ring. Substituted phenols with 3 reactive positions in the phenol ring can be used conjointly in minor amounts, either individually or as mixtures.

The following can be used as substituted phenols for the present process: m-cresol, 3,4-, 3,5- and 2,5-dimethylphenol, m-ethylphenol, m-propylphenol, m-, n-butylphenol, p-tert.-butylphenol, o- and/or p-, n- and/or isopropenylphenol, o- and/or p-allylphenol, o-phenylphenol, p-phenylphenol, m-phenylphenol, o- and/or p- α- and/or β-phenylethylphenol individually or as mixtures, o- and/or p- α- and/or β-phenylisopropylphenol, o- and/or p- α- and/or β-methylphenylethylphenol, and also technical alkylation products from olefines und phenols, the manufactures of which has been described, for example, in British Patent Specification 327,382, page 5, line 25 - 34, and o- and/or p-aminophenols. Furthermore, dihydroxydiphenolalkane derivatives of the general formula

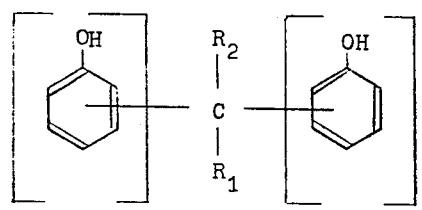

wherein $R_1$ and $R_2$ are identical or different and denote a hydrogen atom or an aliphatic radical of the general formula $C_nH_{2n+1}$, wherein n has the values 1 to 5 with the limitation that the substituent

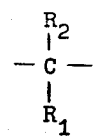

has to be in o- and/or p-position relative to the phenolic hydroxyl-groups, can also be used as substituted phenols.

Preferably p-tert.-butylphenol, o- and/or p- α- and/or β-phenylethylphenol, individually or in mixture, o- and/or p- α- and/or β-phenylisopropylphenol, o- and/or p- α- and/or β-methylphenylethylphenol, further technical alkylation products of olefines and phenols, the production of which has been described in British patent 327,382, page 5, lines 25–34. Aqueous formaldehyde solutions are employed preferably. The following are suitable for use as formaldehyde or formaldehyde donors: Aqueous formaldehyde solutions, gaseous formaldehyde, paraformaldehyde and hexamethylenetetramine.

The suitable secondary amines include those organic substances which contain one or more secondary amino groups and which are soluble in the reaction mixture and preferably not less basic than ammonia, which means that the pK value should be 5 at 20°C. Examples of such secondary amines are: dimethylamine, diethylamine, diisopropylamine, diethanolamine, piperidine, morpholine and piperazine. Dimethylamine, diethylamine, diethanolamine and morpholine are employed preferably.

The acids, the amount of which is aquivalent to the amount of amine employed, are chosen from the group of acids having the following properties:

1. they have to be water-soluble (solubility > 5 % by weight).
2. their $pK_a$ value has to be ≤ 4.

Examples for such acids are: hydrochloric acid, sulfuric acid, nitric acid, oxalic acid, maleic acid, phosphoric acid, formic acid and p-toluenesulfonic acid. Hydrochloric acid and oxalic acid are employed preferably.

Examples of suitable protective colloids which can be added to the dispersion to increase the stability are: polyvinylalcohol and water-soluble derivatives of polyvinylalcohol (for example products in which about 5% of hydroxyl groups are acetalysed, say with butyraldehyde, or in which about 10% of the hydroxyl groups are esterified say with acetic acid). (Compare Ullmanns Enzyklopaedie der technischen Chemie, 1962, Volume 14, pages 236–241), as well as non-ionic cellulose ethers which are soluble in boiling water (compare Ullmanns Enzyklopaedie der technischen Chemie, 1962, Volume 5, page 171), which can be employed proportionately, as well as addition products of about 30 mols of ethylene oxide to p-n-nonylphenol Preferably polyvinylalcohol, of which 88 mol % are saponified, having a degree of polymerisation of 1000 – 1500, and hydroxyethylcellulose, as well as addition products of about 30 mols of ethylene oxide to p-n-nonylphenol.

The dispersions manufactured according to the invention can be employed in all fields of use of conventional phenolic resins or phenolic resin solutions and offer additional technical and commercial advantages through avoiding inflammable and/or toxic solvents and through the low content of unreacted volatile starting compounds and also through their ability of being deposited electrophoretically. As examples of fields of use there may be mentioned: Binders for lacquers and coating agents for metallic and non-metallic substrates, binders for the manufacture of slag wool slabs, hard papers and hard fabrics, based on cotton or glass fabrics, binders for decorative and electronic purposes, such as battery separators, air filter papers and oil filter papers for motor vehicles, binders for abrasives, such as abrasive paper, abrasive cloth and abrasive discs, thermosetting moulding materials for the manufacture of cured mouldings such as, for example, brake linings, and binders for materials based on wood, such as plywood, chipboards and hardboards.

EXAMPLE 1

1 Mol of a mixture of α- and β-phenylethylphenol, 4 mols of phenol, 359 g of deionised water, 376 g of 44% strength by weight of aqueous formaldehyde solution, 63 g of crystalline oxalic acid, 115 g of 40% strength by weight aqueous dimethylamine solution and 30 g of a polyvinylalcohol which is saponified to the extent of 88 mol % are kept at the boil under reflux for 4 hours, whilst stirring. The mixture is then cooled to below 40°C, whilst stirring.

The dispersion thus obtained has a solids content of 49.8% and a viscosity of 330 cP. It can be diluted with water in all proportions.

EXAMPLE 2

The instructions in Example 1 are followed but additionally 10 g of a hydroxyethylcellulose are added.

The dispersion thus obtained has increased stability and a smaller particle size than that obtained according to Example 1.

EXAMPLE 3

The instructions in Example 1 are followed but instead of the 115 g of 40% strength by weight aqueous dimethylamine solution, 105 g of diethanolamine are employed.

The dispersion thus obtained is distinguished by virtue of its small particle size, by extremely good penetrating capacity into porous substances.

EXAMPLE 4

The instructions in Example 1 are followed but instead of 63 g of crystalline oxalic acid an equivalent amount of 35% strength aqueous hydrochloric acid is employed. The dispersion thus obtained is distinguished by increased speed of curing.

Production of a mixture of α- and β-phenylethylphenol as solution in the required amount of phenol (raw product for Examples 1, 2, 3 and 4).

376 g phenol (4 mols), 104 g styrene (1 mol) and 20 g of crystalline oxalic acid are mixed and heated to 150°–160°C, while stirred, and kept at this temperature for four hours. Thereafter the contents of free styrene has dropped to below 1 percent by weight, and a light-colored oily reaction product is obtained.

In a special embodiment of the present invention, for which arylsubstituted phenols having an aromatic ring in the substitutent are employed, such components are preferred which are, dissolved in phenol or substituted phenol, produced in a novel production step. The arylsubstituted phenol is made in a dissolved state by reacting 1 mol of phenol or substituted phenol respectively, individually or in mixture, and 1 mol of styrene or styrene derivative in excess phenol or substituted phenol respectively, individually or in mixture, as the solvent by heating in the presence of an acid as catalyzer, whereby this working method is characterized in that about 2–5% by weight of oxalic acid, preferably 2.5–3.5% by weight oxalic acid, relative to the total weight of phenol or substituted phenol respectively, and styrene or styrene derivative respectively, are employed and the mixture is heated to 150°–160°C for so long until at least 95 % by weight of the employed styrene or styrene derivative is present in reacted form.

The solution being such obtained has the great advantage of being rather light-colored, nearly free of byproducts and is suitable for the manufacture of dispersions of the present invention directly without any washing and distilling procedures.

Therefore the most preferred embodiment of the invention includes the manufacture of the arylsubstituted phenols as solution in phenol or substituted phenol and the subsequent reaction to form the dispersion. This preferred embodiment is demonstrated by this specification Examples 1–4 in combination with the manufacturing direction for a mixture of α- and β-phenylethylphenol as solution in the required amount of phenol or substituted phenol, as raw product for the Examples 1–4.

The manufacture of alkylaryl phenol solutions, such as explained above, has been disclosed by the same applicant is Swiss patent application 9197/72 of June 19, 1972 and application of a addition thereto of number 6796/73 of May 14, 1973.

The most preferred subject of the invention is a method for the production of self-emulsified, water-dilutable, aqueous dispersions of thermosetting reaction products of mixtures of monohydroxybenzene compounds and formaldehyde and secondary amine in water, whereby these components are made to react by heating, characterized in that:

A. in the first step a solution of substituted phenol in phenol is made by reaction of 1 mol of phenol with 1 mol of styrene or styrene derivative in excess phenol as the solvent, by heating, whereby about 2 to 5% by weight of oxalic acid, preferably 2,5 to 3.5% by weight, relative to the total amount of phenol and styrene or styrene derivative respectively, are employed and the mixture is heated in one step to about 150° to 160°C and kept at this temperature until at least 95% by weight of the styrene or styrene derivative employed is present in reacted form, and B. in the second step the obtained solution of the raw product (without further purification) is mixed with formaldehyde or formaldehyde-donating compounds and secondary amine (individually or in mixture), whereby the mixture consisting of phenol and substituted phenol (raw product solution) is employed in such amounts that the average functionality of the sum of the phenolic compounds to formaldehyde is between 2.1 and 2.8 and the amount of formaldehyde is so chosen that the molar ratio of the total sum of added formaldehyde to the sum of phenolic compounds (in the raw product solution) is between 0.9 to 1.5 and 1 and the secondary amine being employed in amounts of 50 to 200 mol %, relative to the total weight of phenol (in the raw product solution), as well as an amount of acid equivalent to the amount of amine employed, in the presence of such amounts of water that the sum of water added and the reaction water formed amounts to 30 to 60% by weight relative to the weight of the total batch, and then the mix is heated until a sample of the dispersions shows a B-time of 30 sec to 10 minutes at 160°C and the mix is cooled subsequently whilst stirred, and optionally whilst adding water and/or protective colloids.

What is claimed is:

1. Process for the manufacture of a water-dilutable, self-emulsified, aqueous dispersion of a thermosetting reaction product which comprises
   a. warming an aqueous mixture of
   1. phenol,
   2. a substituted phenol having from 1 to 4 substituents on the phenol nucleus and having at least one ring carbon atom available for reaction with formaldehyde, and which substituted phenol has a speed of reaction which is 40 to 150 percent of the speed of reaction of unsubstituted phenol,
   3. formaldehyde or a formaldehyde donor,
   4. a secondary amine, and
   5. an acid
   until a sample of the dispersion reaction mixture has a B-time of 30 seconds to 10 minutes at 160°C, and
   b. while stirring, cooling the mixture from step (a), said process being further characterized in the mixture of substituted phenol and phenol is employed in a ratio such that the average functionality of the sum of the phenolic compounds (1) and (2) relative to the formaldehyde component (3) is between 2.1 and 2.8, and the amount of formaldehyde in the mixture being so chosen that the molar ratio of the total sum of formaldehyde (3) to the sum of the phenolic compounds (1) and (2) ranges from about 0.9 to 1.5 to 1, and the secondary amine content (4) in the mixture ranges from about 50 to about 200 mol percent, relative to the total weight of the phenols (1) and (2), the amount of acid (5) in the mixture being equivalent to the secondary amine (4), the amount of water in the mixture, including added water and water of reaction, ranging from 30 to 60 percent by weight, relative to the weight of the total mixture.

2. Process of claim 1 wherein the substituted phenol component (2) is made by heating to about 150° to 160°C a mixture of phenol and a styrene compound in excess phenol as the solvent in the presence of from about 1 to 5 percent by weight of oxalic acid, relative to the total amount of phenol and the styrene compound, until the reaction mixture contains at least 95 percent by weight of an equimolar phenol-styrene reaction product.

3. Process of claim 1 wherein the substituted phenol (2) is selected from the group consisting of
   p-tert-butyl phenol
   o-$\alpha$-phenylethylphenol
   o-$\beta$-phenylethylphenol
   p-$\alpha$-phenylethylphenol
   p-$\beta$-phenylethylphenol
   o-$\alpha$-phenylisopropylphenol
   o-$\beta$-phenylisopropylphenol
   p-$\alpha$-phenylisopropylphenol
   p-$\beta$-phenylisopropylphenol
   o-$\alpha$-methylphenylethylphenol
   o-$\beta$-methylphenylethylphenol
   p-$\alpha$-methylphenylethylphenol
   p-$\beta$-methylphenylethylphenol,
and mixtures thereof.

4. Process of claim 1 wherein as phenol (1) and substituted phenol (2) there is used a mixture of phenol and $\alpha$- and $\beta$-phenylethylphenol.

5. Process of claim 1 wherein a member of the group consisting of water, a protective colloid, and mixtures of water and a protective colloid are added to the mixture during the stirring and cooling step (b).

6. Product produced by the process of claim 1.

7. Product produced by the process of claim 2.

* * * * *